United States Patent
Xie et al.

(10) Patent No.: US 11,756,170 B2
(45) Date of Patent: Sep. 12, 2023

(54) METHOD AND APPARATUS FOR CORRECTING DISTORTED DOCUMENT IMAGE

(71) Applicant: BEIJING BAIDU NETCOM SCIENCE TECHNOLOGY CO., LTD., Beijing (CN)

(72) Inventors: Qunyi Xie, Beijing (CN); Xiameng Qin, Beijing (CN); Yulin Li, Beijing (CN); Junyu Han, Beijing (CN); Shengxian Zhu, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 332 days.

(21) Appl. No.: 17/151,783

(22) Filed: Jan. 19, 2021

(65) Prior Publication Data
US 2021/0192696 A1 Jun. 24, 2021

(30) Foreign Application Priority Data
Jan. 20, 2020 (CN) .......................... 202010066508.7

(51) Int. Cl.
G06T 5/00 (2006.01)
G06N 3/08 (2023.01)
G06T 5/30 (2006.01)

(52) U.S. Cl.
CPC ............. *G06T 5/006* (2013.01); *G06N 3/08* (2013.01); *G06T 5/30* (2013.01);
(Continued)

(58) Field of Classification Search
CPC ... G06N 3/08; G06T 5/30; G06T 2207/20081; G06T 2207/20084; G06T 2207/30176;
(Continued)

(56) References Cited

U.S. PATENT DOCUMENTS 5,848,197 A 12/1998 Ebihara
2016/0171727 A1* 6/2016 Bouchard ............... G06T 5/002
382/131
(Continued)

FOREIGN PATENT DOCUMENTS

CN 105118040 A 12/2015
CN 106952236 A 7/2017
(Continued)

OTHER PUBLICATIONS

Zewei Wang, Jingjing Zhang, Xingzhuo Du, Sihua Cao, Wenxuan Wei, "Correction of images projected on non-white surfaces based on deep neural network," Proc. SPIE 12342, Fourteenth Int'l Conference on Digital Image Processing (ICDIP 2022), 123423H (Oct. 12, 2022); https://doi.org/10.1117/12.2644283 (Year: 2022).*
(Continued)

Primary Examiner — Leon Viet Q Nguyen
(74) Attorney, Agent, or Firm — Dilworth IP, LLC (57) ABSTRACT

Embodiments of the present disclosure provide a method and apparatus for correcting a distorted document image, where the method for correcting a distorted document image includes: obtaining a distorted document image; and inputting the distorted document image into a correction model, and obtaining a corrected image corresponding to the distorted document image; where the correction model is a model obtained by training with a set of image samples as inputs and a corrected image corresponding to each image sample in the set of image samples as an output, and the image samples are distorted. By inputting the distorted document image to be corrected into the correction model, the corrected image corresponding to the distorted document image can be obtained through the correction model, which realizes document image correction end-to-end, improves
(Continued)

accuracy of the document image correction, and extends application scenarios of the document image correction.

15 Claims, 3 Drawing Sheets

(52) U.S. Cl.
CPC ............ *G06T 2207/20081* (2013.01); *G06T 2207/20084* (2013.01); *G06T 2207/30176* (2013.01)

(58) Field of Classification Search
CPC ......... G06T 2207/10004; G06T 3/0093; G06T 5/001; G06T 5/002
USPC .................. 382/155–159, 275–276, 215
See application file for complete search history.

(56) References Cited

U.S. PATENT DOCUMENTS

| | | | |
|---|---|---|---|
| 2019/0266701 A1* | 8/2019 | Isikdogan | G06T 5/20 |
| 2020/0005034 A1 | 1/2020 | Farivar et al. | |
| 2020/0020082 A1 | 1/2020 | Zhaneisen et al. | |
| 2020/0334871 A1* | 10/2020 | Su | G06T 5/002 |
| 2021/0256253 A1* | 8/2021 | Chen | G06F 40/106 |

FOREIGN PATENT DOCUMENTS

| | | | | |
|---|---|---|---|---|
| CN | 107609549 A | | 1/2018 | |
| CN | 107749048 A | | 3/2018 | |
| CN | 108335266 A | | 7/2018 | |
| CN | 108510467 A | | 9/2018 | |
| CN | 108968916 A | * | 12/2018 | ........... A61B 5/7207 |
| CN | 109598270 A | | 4/2019 | |
| CN | 109635714 A | | 4/2019 | |
| CN | 109753971 A | | 5/2019 | |
| CN | 109829437 A | | 5/2019 | |
| CN | 109993713 A | | 7/2019 | |
| CN | 110136069 A | | 8/2019 | |
| CN | 110211048 A | | 9/2019 | |
| CN | 110287960 A | | 9/2019 | |
| CN | 110427938 A | | 11/2019 | |
| CN | 110570373 A | | 12/2019 | |
| JP | H05303634 A | | 11/1993 | |
| JP | H118763 A | | 1/1999 | |
| JP | 2018067154 A | | 4/2018 | |
| JP | 2018201146 A | | 12/2018 | |
| JP | 2019097055 A | | 6/2019 | |
| WO | 2019046003 A1 | | 3/2019 | |

OTHER PUBLICATIONS

Ma, Ke et al., DocUNet: Document Image Unwarping via A Stacked U-Net, IEEE/CVF Conference on Computer Vision and Pattern Recognition, Jun. 2018, pp. 4700-4709.

First Office Action in KR Patent Application No. 10-2021-0008087 dated Jan. 3, 2022.

Ma, Ke et al., DocUNet: Document Image Unwarping via A Stacked U-Net, 2018, IEEE/CVF Conference on Computer Vision and Pattern Recognition, IEEE Computer Society, pp. 4700-4709.

Zhan, Fangneng et al., ESIR: End-to-end Scene Text REcognition via Iterative Rectification, Cornell University Library, Dec. 2018, pp. 1-8.

European Search Report in EP Patent Application No. 21152493.9 dated May 24, 2021.

Notice of Reason for Rejection in JP Patent Application No. 2021-007302 dated Mar. 22, 2022.

Liu et al., Reseach on Rectification Method of Curved Document Image, 2007, pp. 1-3.

Bai, Xiang et al., Deep learning for scene text detection and recognition, Science China Press, 2018, pp. 531-544.

First Office Action in CN Patent Application No. 202010066508.7 dated Jan. 20, 2023.

Lu, Yi et al., Algorithm for geometric distorted image rectification based on neural network, Computer Engineering and Design Sep. 2007, vol. 28, No. 17, pp. 4290-4292.

Notice of Allowance in CN Patent Application No. 202010066508.7 dated May 31, 2023.

* cited by examiner

METHOD AND APPARATUS FOR CORRECTING DISTORTED DOCUMENT IMAGE

CROSS-REFERENCE TO RELATED APPLICATION

This application claims priority to Chinese Patent Application No. 202010066508.7, filed on Jan. 20, 2020, which is hereby incorporated by reference in its entirety.

TECHNICAL FIELD

Embodiments of the present disclosure relate to the technical field of big data processing, and in particular to a method and apparatus for correcting a distorted document image.

BACKGROUND

Document image correction is a process of restoring a wrinkled or curled document in an image to a flat state, which can be referred to simply as document correction.

Two methods are usually used for document correction: a global deformation parameter prediction and a pixel-by-pixel deformation parameter prediction. The former can only predict a unique group of deformation parameters, and cannot be applied to a scenario with inconsistent pixel deformation. The latter can predict deformation parameters for all pixels, but deformation parameter prediction and image restoration are two independent steps. Since the deformation parameters are dense, and the image restoration adopts a deformation inverse operation, use of different methods according to different types of the deformation parameters causes a large number of calculations in a process of the image restoration, and the document image correction has cumbersome steps, a high error and a poor correction effect.

SUMMARY

Embodiments of the present disclosure provide a method and apparatus for correcting a distorted document image, which improves accuracy of document image correction, and extends application scenarios of the document image correction.

In a first aspect, an embodiment of the present disclosure provides a method for correcting a distorted document image, including:

obtaining a distorted document image; and inputting the distorted document image into a correction model, and obtaining a corrected image corresponding to the distorted document image; where the correction model is a model obtained by training with a set of image samples as inputs and a corrected image corresponding to each image sample in the set of image samples as an output, and the image samples are distorted.

Optionally, the correction model includes a deformation parameter prediction module and a deformation correction module connected in series; where the deformation parameter prediction module is a U-shaped convolutional neural network model obtained by training with the set of image samples as inputs and a deformation parameter of each pixel of each image sample included in the set of image samples as an output, and the deformation correction module is a model obtained by training with the set of image samples and output results of the deformation parameter prediction module as inputs and the corrected image corresponding to each image sample in the set of image samples as an output;

the inputting the distorted document image into the correction model, and obtaining the corrected image corresponding to the distorted document image includes:

inputting the distorted document image into the correction model, outputting an intermediate result through the deformation parameter prediction module, and obtaining, according to the intermediate result, the corrected image corresponding to the distorted document image through the deformation correction module; the intermediate result including a deformation parameter of each pixel in the distorted document image.

Optionally, the deformation parameter prediction module includes at least two stages of deformation parameter prediction sub-modules connected in series; where a first-stage deformation parameter prediction sub-module is a U-shaped convolutional neural network model obtained by training with the set of image samples as inputs and a deformation parameter of each pixel of each image sample included in the set of image samples as an output, and a second-stage deformation parameter prediction sub-module is a U-shaped convolutional neural network model obtained by training with the set of image samples and output results of the first-stage deformation parameter prediction sub-module as inputs and a deformation parameter of each pixel of each image sample included in the set of image samples an output, and so on; and the intermediate result is an output result of a last-stage deformation parameter prediction sub-module of the at least two stages of deformation parameter prediction sub-modules.

Optionally, the obtaining, according to the intermediate result, the corrected image corresponding to the distorted document image through the deformation correction module includes:

obtaining an operating parameter, the operating parameter indicating the number of pixels on which correction operations are performed in parallel;

obtaining, according to the operating parameter, multiple pixels in the distorted document image; and correcting, according to deformation parameters respectively corresponding to the multiple pixels, the multiple pixels in parallel through the deformation correction module, and obtaining multiple corrected pixels.

Optionally, the U-shaped convolutional neural network model includes an encoding unit and a decoding unit, the encoding unit and the decoding unit each include multiple convolutional layers, and a convolutional layer in the encoding unit includes multiple dilation convolution operations.

Optionally, dilation ratios between the multiple dilation convolution operations included in the convolutional layer in the encoding unit gradually increase and are coprime.

Optionally, the U-shaped convolutional neural network model further includes a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

Optionally, a convolutional layer in the decoding unit includes a convolution operation and a recombination operation, the convolution operation is used for up-sampling a feature map, and the recombination operation is used for reconstructing the number of rows, columns, and dimensions of a matrix for the up-sampled feature map.

In a second aspect, an embodiment of the present disclosure provides an apparatus for correcting a distorted document image, including:

an obtaining module, configured to obtain a distorted document image; and a correcting module, configured to input the distorted document image into a correction model, and obtain a corrected image corresponding to the distorted document image; where the correction model is a model obtained by training with a set of image samples as inputs and a corrected image corresponding to each image sample in the set of image samples as an output, and the image samples are distorted.

Optionally, the correction model includes a deformation parameter prediction module and a deformation correction module connected in series; where the deformation parameter prediction module is a U-shaped convolutional neural network model obtained by training with the set of image samples as inputs and a deformation parameter of each pixel of each image sample included in the set of image samples as an output, and the deformation correction module is a model obtained by training with the set of image samples and output results of the deformation parameter prediction module as inputs and the corrected image corresponding to each image sample in the set of image samples as an output;

the correcting module is specifically configured to:

input the distorted document image into the correction model, output an intermediate result through the deformation parameter prediction module, and obtain, according to the intermediate result, the corrected image corresponding to the distorted document image through the deformation correction module; the intermediate result including a deformation parameter of each pixel in the distorted document image.

Optionally, the deformation parameter prediction module includes at least two stages of deformation parameter prediction sub-modules connected in series; where a first-stage deformation parameter prediction sub-module is a U-shaped convolutional neural network model obtained by training with the set of image samples as inputs and a deformation parameter of each pixel of each image sample included in the set of image samples as an output, and a second-stage deformation parameter prediction sub-module is a U-shaped convolutional neural network model obtained by training with the set of image samples and output results of the first-stage deformation parameter prediction sub-module as inputs and a deformation parameter of each pixel of each image sample included in the set of image samples as an output, and so on; and the intermediate result is an output result of a last-stage deformation parameter prediction sub-module of the at least two stages of deformation parameter prediction sub-modules.

Optionally, the correcting module is specifically configured to:

obtain an operating parameter, the operating parameter indicating the number of pixels on which correction operations are performed in parallel;

obtain, according to the operating parameter, multiple pixels in the distorted document image; and correct, according to deformation parameters respectively corresponding to the multiple pixels, the multiple pixels in parallel through the deformation correction module, and obtain multiple corrected pixels.

Optionally, the U-shaped convolutional neural network model includes an encoding unit and a decoding unit, the encoding unit and the decoding unit each include multiple convolutional layers, and a convolutional layer in the encoding unit includes multiple dilation convolution operations.

Optionally, dilation ratios between the multiple dilation convolution operations included in the convolutional layer in the encoding unit gradually increase and are coprime.

Optionally, the U-shaped convolutional neural network model further includes a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

Optionally, a convolutional layer in the decoding unit includes a convolution operation and a recombination operation, the convolution operation is used for up-sampling a feature map, and the recombination operation is used for reconstructing the number of rows, columns, and dimensions of a matrix for the up-sampled feature map.

In a third aspect, an embodiment of the present disclosure provides an apparatus for correcting a distorted document image, including: a memory and a processor;

where the memory is configured to store program instructions; and the processor is configured to call the program instructions stored in the memory to implement the method according to any one of implementations of the first aspect of the present disclosure.

In a fourth aspect, an embodiment of the present disclosure provides a computer-readable storage medium, including: a readable storage medium and a computer program, where the computer program is used to implement the method according to any one of implementations of the first aspect of the present disclosure.

In a fifth aspect, an embodiment of the present disclosure provides a computer program product, where the computer program product includes a computer program (i.e., execution instructions), and the computer program is stored in a readable storage medium. A processor can read the computer program from the readable storage medium, and the processor executes the computer program to implement the method according to any one of implementations of the first aspect of the present disclosure.

In a sixth aspect, an embodiment of the present disclosure provides a computer program, where the computer program is stored in a readable storage medium. A processor can read the computer program from the readable storage medium, and the processor executes the computer program to implement the method according to any one of implementations of the first aspect of the present disclosure.

In the method and apparatus for correcting a distorted document image according to the embodiments of the present disclosure, the distorted document image to be corrected is inputted into the correction model, and the corrected image corresponding to the distorted document image can be obtained through the correction model, which realizes document image correction end-to-end. Since the correction model is a model trained based on a large number of samples, application scenarios are more extensive, and accuracy and effect of document image correction are improved.

BRIEF DESCRIPTION OF DRAWINGS

In order to explain technical solutions in embodiments of the present disclosure or in the prior art more clearly, the following will briefly introduce the drawings that need to be used in the description of the embodiments or the prior art.

Obviously, the drawings in the following description are some embodiments of the present disclosure. For those skilled in the art, other drawings can be obtained based on these drawings without creative effort.

DETAILED DESCRIPTION OF EMBODIMENTS

In order to make the objectives, technical solutions, and advantages of embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, rather than all of the embodiments. Based on the embodiments of the present disclosure, all other embodiments obtained by those skilled in the art without creative effort shall fall within the protection scope of the present disclosure.

Figure 1:
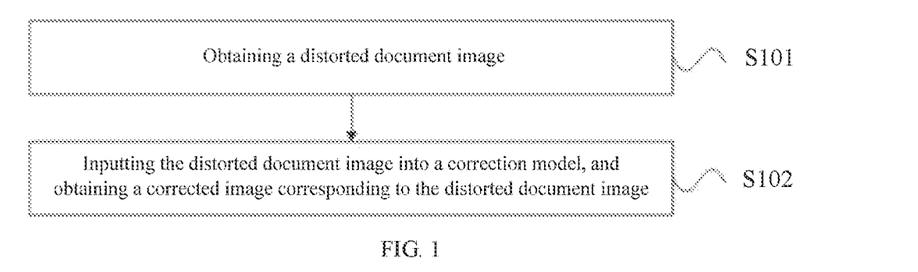
FIG. 1 is a flowchart of a method for correcting a distorted document image provided by an embodiment of the present disclosure.

FIG. 1 is a flowchart of a method for correcting a distorted document image provided by an embodiment of the present disclosure. In the method for correcting a distorted document image provided in this embodiment, an executive entity may be an apparatus for correcting a distorted document image. As shown in FIG. 1, the method for correcting a distorted document image provided in this embodiment can include:

S101, obtaining a distorted document image.

There is a distortion in content of the distorted document image, such as a wrinkle, a curl, etc.

It should be noted that this embodiment does not limit the specific content of the distorted document image. Optionally, the content of the distorted document image can include, but is not limited to, at least one of the following: forms, various language symbols (such as Chinese, English, Korean, French symbols, etc.), numbers, stamps, barcodes, quick response codes, or various invoices (such as taxi invoices, air tickets, fuel tickets, tax invoices for various commodities, etc.).

S102, inputting the distorted document image into a correction model, and obtaining a corrected image corresponding to the distorted document image.

The correction model is a model obtained by training with a set of image samples as inputs and a corrected image corresponding to each image sample in the set of image samples as an output, and the image samples are distorted.

Specifically, the correction model is obtained by training with a large number of image samples with distortions as inputs and the corrected image corresponding to each image sample as an output. Optionally, in order to improve accuracy of the correction model, corrected images corresponding to the image samples do not have distortions. Optionally, a ratio of corrected images which correspond to image samples in the set of image samples and do not have distortions may be greater than a preset ratio, and this embodiment does not limit the specific value of the preset ratio. Since the correction model is an end-to-end model trained through a large number of samples, it also has a good correction effect when pixels in a distorted image have different deformations. Compared with a method using global deformation parameter prediction to realize document image correction in the prior art, the correction effect is significantly improved and application scenarios are more extensive. Moreover, since the correction model is an end-to-end model, compared with a pixel-by-pixel deformation parameter prediction in combination with a deformation inverse operation to realize document image correction in the prior art, a problem of cumbersome correction steps, algorithm modeling matching and a large amount of calculations are avoided, and efficiency and effect of document image correction are improved.

It should be noted that this embodiment does not limit the type of the correction model. Optionally, the type of the correction model may be any one of the following: a neural network model, a deep algorithm model, and a machine algorithm model. Optionally, the neural network model may include, but is not limited to, a Fully Convolutional Networks (FCN) model, and a Convolutional Networks for Biomedical Image Segmentation (U-net) model.

It should be noted that a training method of the correction model is not limited in this embodiment, and may be different according to different types of the model.

As can be seen, in the method for correcting a distorted document image provided by this embodiment of the present disclosure, the distorted document image to be corrected is inputted into the correction model, and the corrected image corresponding to the distorted document image can be obtained through the correction model, which realizes document image correction end-to-end. Since the correction model is a model trained based on a large number of samples, the method for correcting a distorted document image provided in this embodiment has more extensive application scenarios, and the accuracy and effect of document image correction are improved.

Figure 2:
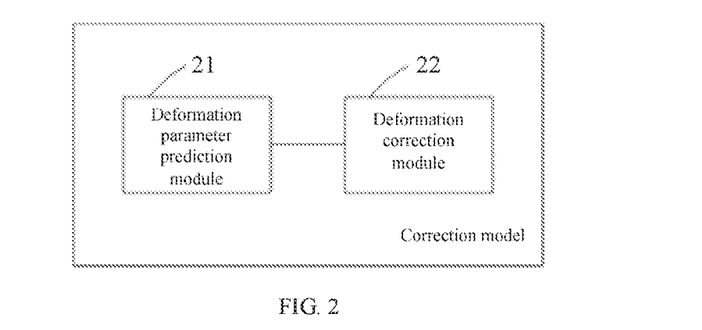
FIG. 2 is a schematic structural diagram of a correction model provided by an embodiment of the present disclosure.

Referring to FIG. 2, on the basis of the above-mentioned embodiment shown in FIG. 1, FIG. 2 is a schematic structural diagram of a correction model provided by an embodiment of the present disclosure. The correction model can include a deformation parameter prediction module 21 and a deformation correction module 22 connected in series. The deformation parameter prediction module 21 is a U-shaped convolutional neural network model obtained by training with the set of image samples as inputs and a deformation parameter of each pixel of each image sample included in the set of image samples as an output. The deformation correction module 22 is a model obtained by training with the set of image samples and output results of the deformation parameter prediction module 21 as inputs and a corrected image corresponding to each image sample in the set of image samples as an output.

Specifically, the correction model is functionally divided into the deformation parameter prediction module and the deformation correction module. Both the deformation parameter prediction module and the deformation correction module are models obtained through training. Among them, the deformation parameter prediction module can obtain the deformation parameter of each pixel in the image. The deformation parameter is used to indicate a degree of deformation of each pixel. The deformation correction module can realize distortion correction of the image based on pixel-level deformation parameters outputted by the deformation parameter prediction module.

Based on the correction model shown in FIG. 2, the inputting the distorted document image into the correction model, and obtaining the corrected image corresponding to the distorted document image in S102 can include:

inputting the distorted document image into the correction model, outputting an intermediate result through the deformation parameter prediction module, and obtaining, according to the intermediate result, the corrected image corresponding to the distorted document image through the deformation correction module; the intermediate result including a deformation parameter of each pixel in the distorted document image.

Since both the deformation parameter prediction module and the deformation correction module are models obtained through training, they are learnable. Compared with the use of the deformation inverse operation to restore the image in the prior art, a problem of algorithm modeling matching and a large amount of calculations is avoided, and the image can be corrected through the learnable deformation correction module based on the deformation parameter of the pixel, which reduces a correction error and improves the correction effect.

In the following, a principle of image correction is explained by taking a bilinear interpolation algorithm used by the deformation correction module as an example. It should be noted that the deformation correction module is not limited to using the bilinear interpolation algorithm, and other learnable algorithms can also be used.

It is assumed that coordinates of a pixel in a distorted document image S is expressed as (u', v'), and coordinates of a pixel, which corresponds to the pixel (u', v'), in a corrected image D obtained after correcting the distorted document image S is expressed as (u, v). The document image correction can be understood as establishing a coordinate mapping relationship between the distorted document image S and the corrected image D, so that each pixel (u, v) in the corrected image D can find the corresponding pixel (u', v') in the distorted document image S, which satisfies:

$$D(u,v)=S(u',v').$$

It is assumed that in the intermediate result obtained through the deformation parameter prediction module, a deformation parameter of a pixel is expressed as $(\Delta u, \Delta v)$, where $\Delta u$ represents an offset of the pixel in the u direction, and $\Delta v$ represents an offset of the pixel in the v direction. The pixel (u', v') and the pixel (u, v) satisfy:

$$u'=u+\Delta u,$$

$$v'=v+\Delta v.$$

It is assumed that the pixel (u', v') is of a floating-point type, a corresponding pixel value cannot be directly obtained in the distorted document image S. Therefore, a bilinear interpolation method is used to obtain a target pixel value, namely:

$$S(u',v')=w_0*S([u'],[v'])+w_1*S([u']+1,[v'])+w_2*S([u'],[v']+1)+w_3*S([u']+1,[v']+1),$$

and, $$q_0=\sqrt{(u'-[u'])^2+(v'-[v'])^2},$$

$$q_1=\sqrt{(u'-[u']-1)^2+(v'-[v'])^2},$$

$$q_2=\sqrt{(u'-[u'])^2+(v'-[v']-1)^2},$$

$$q_3=\sqrt{(u'-[u']-1)^2+(v'-[v']-1)^2},$$

$$w_0=q_0/(q_0+q_1+q_2+q_3),$$

$$w_1=q_1/(q_0+q_1+q_2+q_3),$$

$$w_2=q_2/(q_0+q_1+q_2+q_3),$$

$$w_3=q_3/(q_0+q_1+q_2+q_3).$$

Since the bilinear interpolation algorithm is derivable, the deformation correction module using the bilinear interpolation algorithm is learnable, which ensures end-to-end gradient back propagation of the correction model, reduces the correction error, and improves the correction effect.

Figure 3:
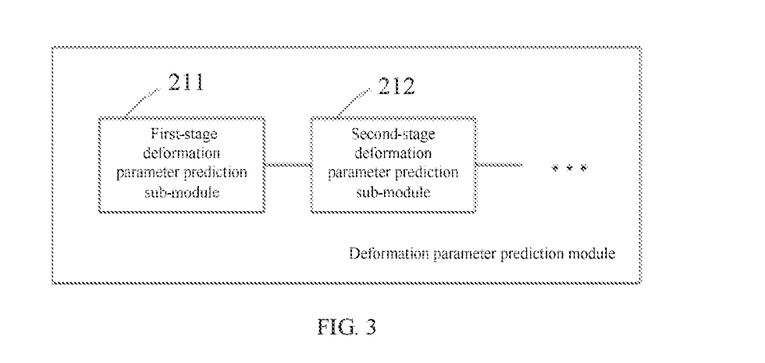
FIG. 3 is a schematic structural diagram of a deformation parameter prediction module provided by an embodiment of the present disclosure.

Optionally, the deformation parameter prediction module can include at least two stages of deformation parameter prediction sub-modules connected in series; where a first-stage deformation parameter prediction sub-module 211 is a U-shaped convolutional neural network model obtained by training with the set of image samples as inputs and a deformation parameter of each pixel of each image sample included in the set of image samples as an output, and a second-stage deformation parameter prediction sub-module 212 is a U-shaped convolutional neural network model obtained by training with the set of image samples and output results of the first-stage deformation parameter prediction sub-module 211 as inputs and the deformation parameter of each pixel of each image sample included in the set of image samples as an output, and so on.

The intermediate result is an output result of a last-stage deformation parameter prediction sub-module of the at least two stages of deformation parameter prediction sub-modules.

Specifically, the deformation parameter prediction module includes multiple deformation parameter prediction sub-modules, and each deformation parameter prediction sub-module is a model obtained through training. The first-stage deformation parameter prediction sub-module is the U-shaped convolutional neural network model obtained by training with the set of image samples as the inputs and the deformation parameter of each pixel of each image sample included in the set of image samples as the output. Starting from the second-stage deformation parameter prediction sub-module, it is the U-shaped convolutional neural network model obtained by training with the set of image samples and output results of a previous-stage deformation parameter prediction sub-module as the inputs and a deformation parameter of each pixel of each image sample included in the set of image samples as the output.

By setting multiple deformation parameter prediction sub-modules, a regression with a finer granularity can be performed step by step, so that the obtained pixel deformation parameters are more accurate, and the end-to-end image correction effect of the correction model is improved.

Optionally, regression verification can be performed on each deformation parameter prediction sub-module, after the training, through same supervision information. In this embodiment, two types of supervision information can be included, one is a coordinate offset of pixels corresponding to a distorted image and a non-distorted image, and the other is the non-distorted image. A difference between a pixel coordinate pair learned by the deformation parameter prediction sub-module can be supervised through the two types of supervision information. In practical applications, since it is more difficult to obtain a pair of a distorted image and a non-distorted image corresponding to each other, it is also possible to synthesize the distorted image by performing an image processing method on the non-distorted image, and save the coordinate offset of the two for training and supervision.

It should be noted that this embodiment does not limit the number of the deformation parameter prediction sub-modules, which may be 2, for example.

Optionally, the obtaining, according to the intermediate result, the corrected image corresponding to the distorted document image through the deformation correction module can include:

obtaining an operating parameter, the operating parameter indicating the number of pixels on which correction operations are performed in parallel;

obtaining, according to the operating parameter, multiple pixels in the distorted document image; and correcting, according to deformation parameters respectively corresponding to the multiple pixels, the multiple pixels in parallel through the deformation correction module, and obtaining multiple corrected pixels.

By using the deformation correction module, efficiency of document image correction is improved by performing correction operations on multiple pixels in parallel.

It should be noted that a value of the operating parameter is not limited in this embodiment, and may be different according to different processor capabilities.

Figure 4:
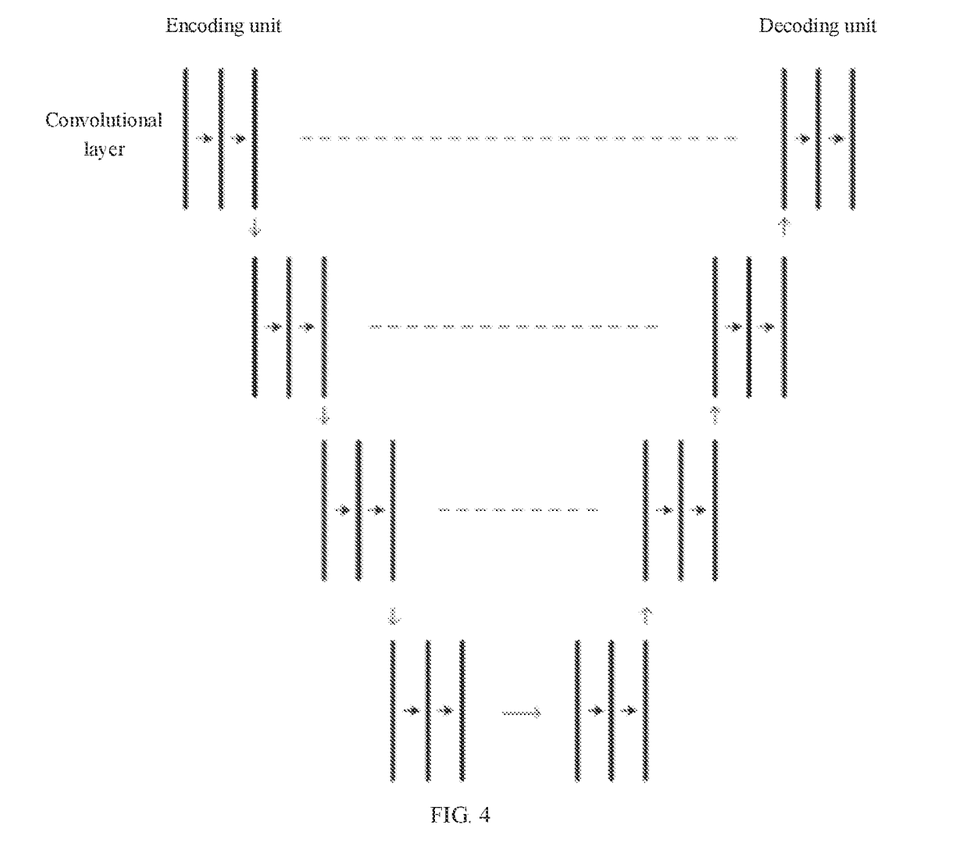
FIG. 4 is a schematic structural diagram of a U-shaped convolutional neural network model provided by an embodiment of the present disclosure.

In the following, the U-shaped convolutional neural network model is exemplified based on the correction model shown in FIG. 2 and in conjunction with FIG. 4. FIG. 4 is a schematic structural diagram of a U-shaped convolutional neural network model provided by an embodiment of the present disclosure. Exemplarily, the U-shaped convolutional neural network model in FIG. 4 may be a Unet model. It should be noted that specific parameter values in examples do not limit the implementation of the U-shaped convolutional neural network model.

Optionally, the U-shaped convolutional neural network model can include an encoding unit and a decoding unit, the encoding unit and the decoding unit each include multiple convolutional layers, and a convolutional layer in the encoding unit can include multiple dilation convolution operations.

Referring to FIG. 4, the encoding unit is shown on the left side of FIG. 4, and the decoding unit is shown on the right side of FIG. 4. The encoding unit and the decoding unit each include 4 convolutional layers. A convolutional layer in the encoding unit may include 3 Dilation Cony operations. Optionally, a convolution kernel of a dilation convolution operation may be 3*3.

By setting the convolution operation in the U-shaped convolutional neural network model to be the dilation convolution operation, a receptive field of the model can be increased by multiple times without changing other parameters of the model, thereby improving accuracy of model operation. For example, in the case that the convolution kernel is 3*3, when a dilation ratio of the dilation convolution operation is 1, the receptive field thereof is 3*3, and when the dilation ratio of the dilation convolution operation is 2, the receptive field thereof is expanded to 5*5, and so on.

It should be noted that this embodiment does not limit the number of convolutional layers included in the encoding unit and the decoding unit, nor the number of the dilation convolution operations included in each convolutional layer.

It should be noted that this embodiment does not limit the name of the convolutional layer. For example, the convolutional layer may also be called a block.

Optionally, dilation ratios between multiple dilation convolution operations included in the convolutional layer in the encoding unit gradually increase and are coprime.

By setting the dilation ratios between multiple dilation convolution operations in the convolutional layer to gradually increase and to be coprime, the receptive field of the model is further expanded and the accuracy of the model operation is further improved.

It should be noted that this embodiment does not limit the number of the dilation convolution operations included in the convolutional layer and a value of the dilation ratio of each dilation convolution operation. For example, the convolutional layer in the encoding unit includes 3 dilation convolution operations, and dilation ratios between the 3 dilation convolution operations is 1, 2, and 3 in order.

Optionally, the U-shaped convolutional neural network model further includes a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

By setting the parallel convolution unit, after multiple dilation convolution operations with different dilation ratios are performed in parallel, the feature map has receptive fields of multiple scales, which further expands the overall receptive field of the model and improves the accuracy of the model operation.

It should be noted that this embodiment does not limit the number of the dilation convolution operations that are included in the parallel convolution unit and performed in parallel, nor values of the dilation ratios of the dilation convolution operations. For example, there are 4 dilation convolution operations performed in parallel, and the dilation ratios are 3, 6, 9, and 12 in order.

Optionally, a convolutional layer in the decoding unit includes a convolution operation and a recombination operation, the convolution operation is used for up-sampling a feature map and the recombination operation is used for reconstructing the number of rows, columns, and dimensions of a matrix for the up-sampled feature map.

Specifically, in the encoding unit of the U-shaped convolutional neural network model, the model usually encodes an input image (also known as an original image) into a feature map through down-sampling, for example, the input image is encoded into a ¹⁄₁₆ feature map through four 2-times down-sampling blocks. In the decoding unit of the U-shaped convolutional neural network model, the model usually restores the feature map outputted by the encoding unit to a feature map of an original size through corresponding rise-sampling (or called up-sampling). In this process, a structural design of an up-sampling block directly determines quality of the restored feature map. In this embodiment, the convolutional layer in the decoding unit includes a convolution operation and a recombination operation, and the up-sampling block is a learnable module. Up-sampling of the feature map is realized through the convolution operation, for example, a feature map with a resolution of (r*H) *(r*W) is obtained through the convolution operation on a feature map with a resolution of H*W, and then a reconstruction of the number of rows, columns, and dimensions of the matrix for the up-sampled feature map is realized through the reorganization operation (also called a reshape operation).

Since the convolutional layers in the decoding unit are learnable, the accuracy of the model operation is improved.

Figure 5:
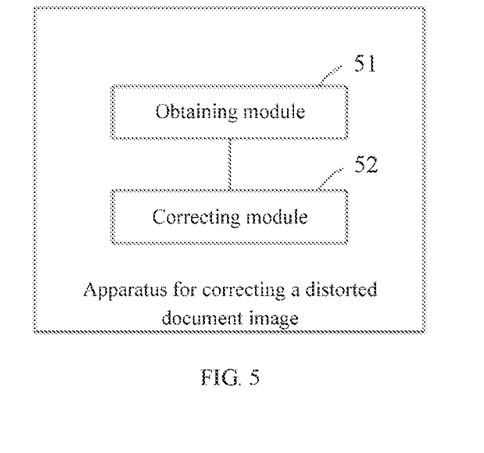
FIG. 5 is a schematic structural diagram of an apparatus for correcting a distorted document image provided by an embodiment of the present disclosure.

FIG. 5 is a schematic structural diagram of an apparatus for correcting a distorted document image provided by an embodiment of the present disclosure. The apparatus for correcting a distorted document image provided in this embodiment is used to execute the method for correcting a distorted document image provided by the embodiments shown in FIGS. 1 to 4. As shown in FIG. 5, the apparatus for correcting a distorted document image provided in this embodiment can include:

an obtaining module 51, configured to obtain a distorted document image; and a correcting module 52, configured to input the distorted document image into a correction model, and obtain a corrected image corresponding to the distorted document image; where the correction model is a model obtained by training with a set of image samples as inputs and a corrected image corresponding to each image sample in the set of image samples as an output, and the image samples are distorted.

Optionally, the correction model includes a deformation parameter prediction module and a deformation correction module connected in series; where the deformation parameter prediction module is a U-shaped convolutional neural network model obtained by training with the set of image samples as inputs and a deformation parameter of each pixel of each image sample included in the set of image samples as an output, and the deformation correction module is a model obtained by training with the set of image samples and output results of the deformation parameter prediction module as inputs and a corrected image corresponding to each image sample in the set of image samples as an output;

the correcting module 52 is specifically configured to:

input the distorted document image into the correction model, output an intermediate result through the deformation parameter prediction module, and obtain, according to the intermediate result, the corrected image corresponding to the distorted document image through the deformation correction module; the intermediate result including a deformation parameter of each pixel in the distorted document image.

Optionally, the deformation parameter prediction module includes at least two stages of deformation parameter prediction sub-modules connected in series; where a first-stage deformation parameter prediction sub-module is a U-shaped convolutional neural network model obtained by training with the set of image samples as inputs and a deformation parameter of each pixel of each image sample included in the set of image samples as an output, and a second-stage deformation parameter prediction sub-module is a U-shaped convolutional neural network model obtained by training with the set of image samples and output results of the first-stage deformation parameter prediction sub-module as inputs and a deformation parameter of each pixel of each image sample included in the set of image samples as an output, and so on; and the intermediate result is an output result of a last-stage deformation parameter prediction sub-module of the at least two stages of deformation parameter prediction sub-modules.

Optionally, the correcting module 52 is specifically configured to:

obtain an operating parameter, the operating parameter indicating the number of pixels on which correction operations are performed in parallel;

obtain, according to the operating parameter, multiple pixels in the distorted document image; and correct, according to deformation parameters respectively corresponding to the multiple pixels, the multiple pixels in parallel through the deformation correction module, and obtain multiple corrected pixels.

Optionally, the U-shaped convolutional neural network model includes an encoding unit and a decoding unit, the encoding unit and the decoding unit each include multiple convolutional layers, and a convolutional layer in the encoding unit includes multiple dilation convolution operations.

Optionally, dilation ratios between the multiple dilation convolution operations included in the convolutional layer in the encoding unit gradually increase and are coprime.

Optionally, the U-shaped convolutional neural network model further includes a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

Optionally, a convolutional layer in the decoding unit includes a convolution operation and a recombination operation, the convolution operation is used for up-sampling a feature map, and the recombination operation is used for reconstructing the number of rows, columns, and dimensions of a matrix for the up-sampled feature map.

The apparatus for correcting a distorted document image provided in this embodiment is used to execute the method for correcting a distorted document image provided by the embodiments shown in FIGS. 1 to 4. The technical principles and effects thereof are similar, and will not be repeated here.

Figure 6:
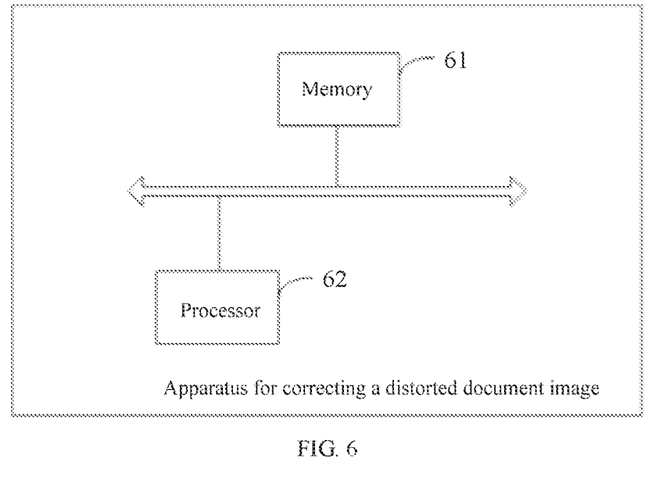
FIG. 6 is another schematic structural diagram of an apparatus for correcting a distorted document image provided by an embodiment of the present disclosure.

FIG. 6 is another schematic structural diagram of an apparatus for correcting a distorted document image provided by an embodiment of the present disclosure. As shown in FIG. 6, the apparatus for correcting a distorted document image can include a memory 61 and a processor 62. The memory is configured to store program instructions; and the processor 61 is configured to execute the instructions stored in the memory 62, so that the apparatus for correcting a distorted document image executes the method for correcting a distorted document image provided in the embodiments shown in FIGS. 1 to 4. The technical principles and effects are similar, and will not be repeated here.

Optionally, the processor may be a graphics processing unit (GPU).

Those skilled in the art can understand that all or part of the steps in the foregoing method embodiments can be implemented by hardware relevant to program instructions. The aforementioned program can be stored in a computer-readable storage medium. When the program is executed, the steps including the foregoing method embodiments are executed; and the foregoing storage medium includes: a ROM, a RAM, a magnetic disk, an optical disk or other media that can store program codes.

According to an embodiment of the present application, the present application also provides a computer program product, where the computer program product includes a computer program (i.e., execution instructions), and the computer program is stored in a readable storage medium. A processor can read the computer program from the readable storage medium, and the processor executes the computer program to implement the solution provided by any of the foregoing embodiments.

According to an embodiment of the present application, the present application also provides a computer program, where the computer program is stored in a readable storage medium. A processor can read the computer program from the readable storage medium, and the processor executes the computer program to implement the solution provided by any of the foregoing embodiments.

Finally, it should be noted that the above embodiments are only used to illustrate the technical solutions of the embodiments of the present disclosure, rather than limiting them; although the embodiments of the present disclosure have been described in detail with reference to the foregoing embodiments, those skilled in the art should understand that: they can still modify the technical solutions recorded in the foregoing embodiments, or equivalently replace some or all of the technical features; and these modifications or replacements do not cause the essence of the corresponding technical solutions to deviate from the scope of the technical solutions of the embodiments of the present disclosure.

What is claimed is:

1. A method for correcting a distorted document image, comprising:
    obtaining a distorted document image; and
    inputting the distorted document image into a correction model, and obtaining a corrected image corresponding to the distorted document image; wherein the correction model is a model obtained by training with a set of image samples as inputs and a corrected image corresponding to each image sample in the set of image samples as an output, and the image samples are distorted,
    wherein the correction model comprises a deformation parameter prediction module and a deformation correction module connected in series; wherein the deformation parameter prediction module is a U-shaped convolutional neural network model obtained by training with the set of image samples as inputs and a deformation parameter of each pixel of each image sample comprised in the set of image samples as an output, and the deformation correction module is a model obtained by training with the set of image samples and output results of the deformation parameter prediction module as inputs and the corrected image corresponding to each image sample in the set of image samples as an output;
    the inputting the distorted document image into the correction model, and obtaining the corrected image corresponding to the distorted document image comprises:
    inputting the distorted document image into the correction model, outputting an intermediate result through the deformation parameter prediction module, and obtaining, according to the intermediate result, the corrected image corresponding to the distorted document image through the deformation correction module; the intermediate result comprising a deformation parameter of each pixel in the distorted document image;
    wherein the deformation parameter prediction module comprises at least two stages of deformation parameter prediction sub-modules connected in series; wherein a first-stage deformation parameter prediction sub-module is a U-shaped convolutional neural network model obtained by training with the set of image samples as inputs and a deformation parameter of each pixel of each image sample comprised in the set of image samples as an output, and another stage deformation parameter prediction sub-module is a U-shaped convolutional neural network model obtained by training with the set of image samples and output results of a previous deformation parameter prediction sub-module as inputs and a deformation parameter of each pixel of each image sample comprised in the set of image samples as an output;
    the intermediate result is an output result of a last-stage deformation parameter prediction sub-module of the at least two stages of deformation parameter prediction sub-modules.

2. The method according to claim 1, wherein the obtaining, according to the intermediate result, the corrected image corresponding to the distorted document image through the deformation correction module comprises:
    obtaining an operating parameter, the operating parameter indicating a number of pixels on which correction operations are performed in parallel;
    obtaining, according to the operating parameter, multiple pixels in the distorted document image; and
    correcting, according to deformation parameters respectively corresponding to the multiple pixels, the multiple pixels in parallel through the deformation correction module, and obtaining multiple corrected pixels.

3. The method according to claim 1, wherein the U-shaped convolutional neural network model comprises an encoding unit and a decoding unit, the encoding unit and the decoding unit each comprise multiple convolutional layers, and a convolutional layer in the encoding unit comprises multiple dilation convolution operations.

4. The method according to claim 1, wherein the U-shaped convolutional neural network model comprises an encoding unit and a decoding unit, the encoding unit and the decoding unit each comprise multiple convolutional layers, and a convolutional layer in the encoding unit comprises multiple dilation convolution operations.

5. The method according to claim 2, wherein the U-shaped convolutional neural network model comprises an encoding unit and a decoding unit, the encoding unit and the decoding unit each comprise multiple convolutional layers, and a convolutional layer in the encoding unit comprises multiple dilation convolution operations.

6. The method according to claim 3, wherein dilation ratios between the multiple dilation convolution operations comprised in the convolutional layer in the encoding unit gradually increase and are coprime.

7. The method according to claim 3, wherein the U-shaped convolutional neural network model further comprises a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

8. The method according to claim 3, wherein a convolutional layer in the decoding unit comprises a convolution operation and a recombination operation, the convolution operation is used for up-sampling a feature map, and the recombination operation is used for reconstructing the a number of rows, columns, and dimensions of a matrix for the up-sampled feature map.

9. An apparatus for correcting a distorted document image, comprising: a memory and a processor;
    wherein the memory is configured to store program instructions; and the processor is configured to call the program instructions stored in the memory to:

obtain a distorted document image; and input the distorted document image into a correction model, and obtain a corrected image corresponding to the distorted document image; wherein the correction model is a model obtained by training with a set of image samples as inputs and a corrected image corresponding to each image sample in the set of image samples as an output, and the image samples are distorted, wherein the correction model comprises a deformation parameter prediction module and a deformation correction module connected in series; wherein the deformation parameter prediction module is a U-shaped convolutional neural network model obtained by training with the set of image samples as inputs and a deformation parameter of each pixel of each image sample comprised in the set of image samples as an output, and the deformation correction module is a model obtained by training with the set of image samples and output results of the deformation parameter prediction module as inputs and the corrected image corresponding to each image sample in the set of image samples as an output;

the processor is specifically configured to:

input the distorted document image into the correction model, output an intermediate result through the deformation parameter prediction module, and obtain, according to the intermediate result, the corrected image corresponding to the distorted document image through the deformation correction module; the intermediate result comprising a deformation parameter of each pixel in the distorted document image;

wherein the deformation parameter prediction module comprises at least two stages of deformation parameter prediction sub-modules connected in series; wherein a first-stage deformation parameter prediction sub-module is a U-shaped convolutional neural network model obtained by training with the set of image samples as inputs and a deformation parameter of each pixel of each image sample comprised in the set of image samples as an output, and another stage deformation parameter prediction sub-module is a U-shaped convolutional neural network model obtained by training with the set of image samples and output results of a previous deformation parameter prediction sub-module as inputs and a deformation parameter of each pixel of each image sample comprised in the set of image samples as an output;

the intermediate result is an output result of a last-stage deformation parameter prediction sub-module of the at least two stages of deformation parameter prediction sub-modules.

10. The apparatus according to claim 9, wherein the processor is specifically configured to:

obtain an operating parameter, the operating parameter indicating a number of pixels on which correction operations are performed in parallel;

obtain, according to the operating parameter, multiple pixels in the distorted document image; and correct, according to deformation parameters respectively corresponding to the multiple pixels, the multiple pixels in parallel through the deformation correction module, and obtain multiple corrected pixels.

11. The apparatus according to claim 9, wherein the U-shaped convolutional neural network model comprises an encoding unit and a decoding unit, the encoding unit and the decoding unit each comprise multiple convolutional layers, and a convolutional layer in the encoding unit comprises multiple dilation convolution operations.

12. The apparatus according to claim 11, wherein dilation ratios between the multiple dilation convolution operations comprised in the convolutional layer in the encoding unit gradually increase and are coprime.

13. The apparatus according to claim 11, wherein the U-shaped convolutional neural network model further comprises a parallel convolution unit between the encoding unit and the decoding unit, the parallel convolution unit is configured to perform multiple dilation convolution operations in parallel on a feature map outputted by a last layer of the convolutional layers in the encoding unit, and dilation ratios between the multiple dilation convolution operations performed in parallel are different.

14. The apparatus according to claim 11, wherein a convolutional layer in the decoding unit comprises a convolution operation and a recombination operation, the convolution operation is used for up-sampling a feature map, and the recombination operation is used for reconstructing a number of rows, columns, and dimensions of a matrix for the up-sampled feature map.

15. A non-transitory computer-readable storage medium, comprising: a readable storage medium and a computer program, wherein the computer program is used to implement the method according to claim 1.

* * * * *